United States Patent Office

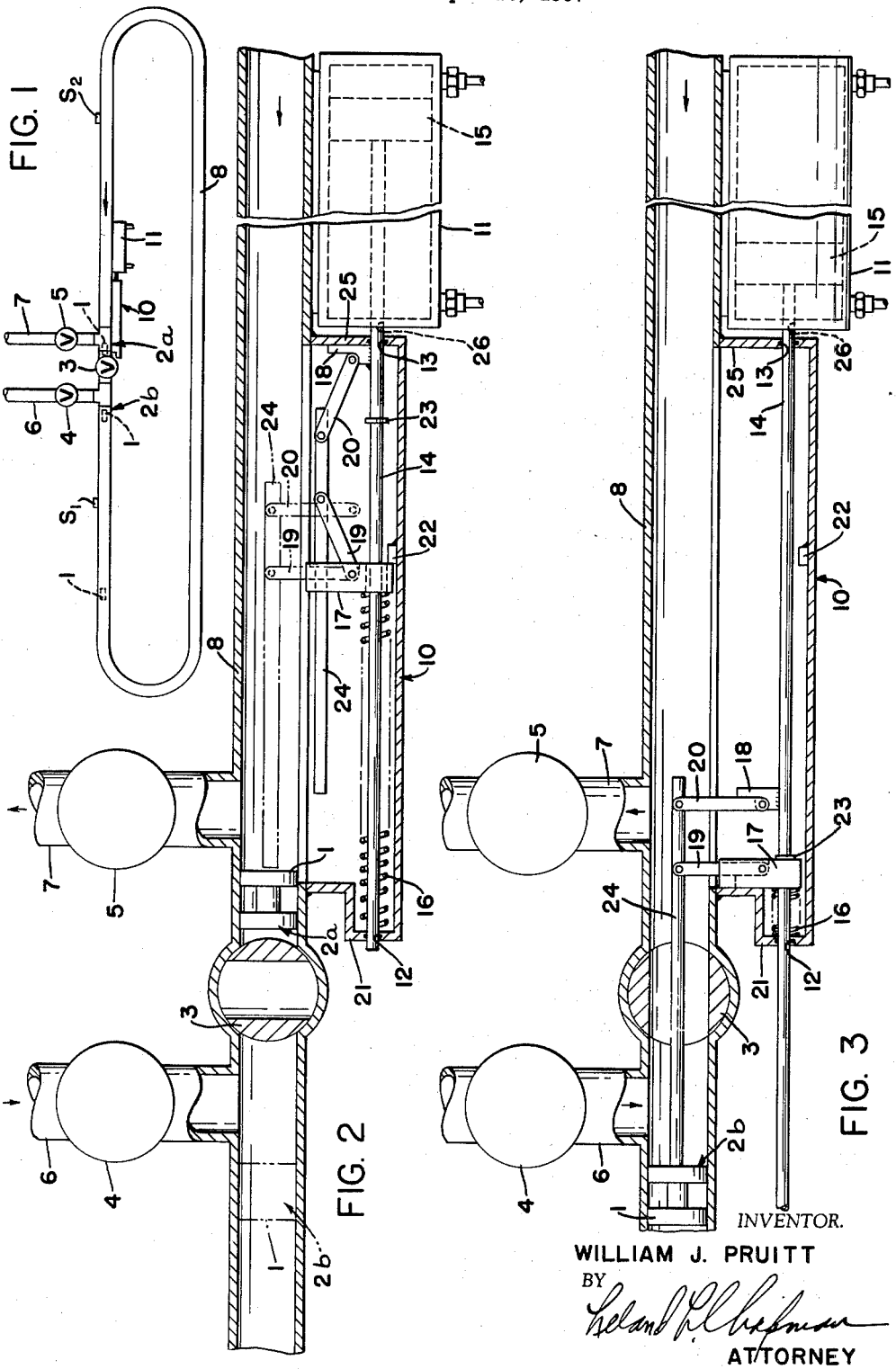

2,948,143
Patented Aug. 9, 1960

2,948,143

APPARATUS FOR IMPELLING OBJECTS WITHIN A PIPELINE

William J. Pruitt, Sheffield Lake, Ohio, assignor to The Standard Oil Company, Cleveland, Ohio, a corporation of Ohio Filed Sept. 16, 1957, Ser. No. 684,240

3 Claims. (Cl. 73—3)

This invention relates to an apparatus for impelling objects within a pipeline and, more particularly, to an apparatus for repositioning a scraper or plug in a calibration loop at its starting point after completion of a calibration cycle.

There are numerous instances today in the petroleum and chemical process industries when it becomes advantageous to move an object within a pipeline without opening the pipeline, removing the object, and readmitting it subsequently to a desired location at some other point in the pipeline. For example, an object must be moved within a pipe in a calibration loop, which is an apparatus often utilized today to determine the accuracy of flow meters while said meters are functioning on pipeline streams.

Such a system is disclosed in U.S. Patent No. 2,772,561. Briefly described, these systems function by forcing, with a liquid under pressure, an object (hereinafter referred to as a "plug") which forms a movable seal inside the pipe through a length of pipe that is formed into a loop. The liquid is diverted from the pipeline stream into the loop by an inlet line and valve, and the liquid forces the plug around the loop. A short distance downstream in the loop the plug trips a switch which closes an electrical circuit, thereby actuating a counter on the product flowmeter under test and initiating a timing device. This electrical circuit remains closed while the plug continues the course of the loop until the plug reaches a position near the end of the loop when the plug trips a second switch which opens the electrical circuit deactuating the counter on the flowmeter and stopping the timing device. Shortly downstream from this second switch, the liquid leaves the loop to re-enter the product stream by means of a discharge line from the loop and valve. The plug comes to rest just beyond the discharge line due to the loss of liquid pressure. A calibration can then be made by a comparison between the flowmeter reading and a calculated flow rate derived from the known volume within the pipe between the two switches and the time that was recorded for the plug to traverse the distance between the switches. Such a calibration loop can be provided with pressure gauges and temperature measuring devices to compare the conditions of the calibration run with average conditions on past determinations. Then a final meter adjustment can be made on the basis of known physical properties such as thermal expansion and compressibility of the liquid being measured.

One disadvantage, however, in utilizing such a calibration loop has been the inconvenience of repositioning the plug from the point where it comes to rest just beyond the loop discharge line to a position just forward of the loop inlet line to prepare the loop for another calibration determination.

Several methods are presently utilized for repositioning the plug, but all result in an excessive use of time and labor. One method now in practice requires physically removing the plug from the line at the end of the loop and admitting it to the line at the start of the loop. With this method flanges or end plates must be removed manually, incurring labor costs and causing spillage of product. Such spillage results in loss of product value and detracts from good housekeeping in the plant. Furthermore, product spillage can be a source of possible hazards should the material be combustible or toxic.

Another known method for repositioning the plug involves moving the plug backwards through the loop of pipe by reversing the flow of the fluid. This method is not desirable since it unduly deteriorates a plug which must be especially designed and constructed to provide an adequate seal when traveling in the direction of measurement flow. In addition, this method requires a complicated system of valves which must be operated manually or the installation of extensive equipment to drive the valves mechanically.

Still another method for repositioning plugs in a continuous loop requires opening and closing a plurality of valves to advance the plug to the starting position by liquid pressure. Again, such practice with valves positioned on large diameter lines involves excessive capital, labor, and maintenance costs.

It is a primary object of this invention to provide a novel apparatus for repositioning a calibrating plug after a completed calibration to the starting point for the plug in the loop. This consists of a mechanical positioner in communication with the pipeline which, when actuated, will enter into the pipeline and impel the plug from the ending position to the starting position of the plug in the loop.

A more complete understanding of the invention and its advantages can be obtained from the following detailed description, taken together with the accompanying drawing, in which Figure 1 is a diagrammatic view showing a calibration loop;

Figure 2 is a detailed view in vertical section of a portion of a calibrating loop showing the plug in position at the end of a calibrating run and (in full lines) the mechanical positioner in its normally retracted position, and also (in dotted lines) in position as the device is partially actuated to place the plunger in contact with the plug; and Figure 3 is a similar view showing the loop valve open, the mechanical positioner fully actuated, and the plug in its starting position.

Referring now to Figure 1, a loop of pipe 8 is connected to an inlet pipe 6 in which a valve 4 is located and an outlet pipe 7 in which a valve 5 is located. A smooth bore valve 3 is positioned in the loop between the inlet and outlet pipes. Switches S1 and S2 are located in the loop as shown, and chamber 10 and cylinder 11, which will be described in greater detail later, are mounted on the pipe as illustrated.

The switches S1 and S2 are not a part of my invention and any known structure for these can be utilized. Generally a small detent projects into the pipe which is tripped by the movement of the plug acting upon this detent.

It will be seen that when valve 3 is closed and when valves 4 and 5 are opened, liquid will flow in through the inlet pipe 6, around the loop 8, and back out through the outlet pipe 7. The liquid will push the plug 1 around in the pipe, actuating switch S1 as it passes, which starts the beginning of the timing cycle, and actuating switch S2 as it passes to complete the timing cycle. The plug will come to rest at position 2a due to loss of liquid pressure as the liquid flows out through pipe 7. To start a new cycle the plug must be moved to a point beyond the inlet entrance into the loop, such as at position 2b, It is the means for accomplishing this to which my invention is directed.

Referring now to Figures 2 and 3 in which the parts of the loop and the positioning device are shown in greater detail, the plug 1 corresponds in cross section to the interior of the pipe 8 and forms a tight seal therein, preventing liquid from flowing past the plug. In this way pressure applied by the liquid behind the plug will force it through the pipe. The valve 3 is a smooth bore valve so that in the open position the plug 1 may pass through it.

A chamber 10, in the form of a substantially rectangular housing, is mounted on and communicates with the pipe 8. The chamber has a relatively short rectangular extension 21 of such dimension as to accommodate a spring 16 when it is fully compressed, as shown in Figure 3. A cylinder 11 is also mounted adjacent the pipe 8 in substantial axial alignment with the chamber 10. A shaft 14 is centered near the bottom of the chamber 10 and is aligned with a central opening 26 in the cylinder 11 by openings 12 and 13 in chamber 10. Annular packing rings are recessed in the openings 12 and 13 to prevent any leakage of liquid. The shaft 14 is connected to a piston 15 operating within the cylinder 11. The means for driving the piston 15 is not part of my invention and any known means, such as steam, compressed air, or hydraulic fluid system, which will cause reciprocating action of the piston 15 within the cylinder 11 will be suitable. A more detailed description of the cylinder 11 will therefore be unnecessary.

Within the chamber 10 the shaft 14 passes through a coiled spring 16 and centrally through the lower portion of a support 17. The shaft 14 also has secured on it an annular guide ring 23 and a second support 18 as shown. While the device is inactive, the supports 17 and 18 are separated a maximum distance, as shown in Figure 2. The support 17 is urged by the spring 16 against a stop 22 which is secured to the bottom of the chamber 10 as shown. The support 18 rests against the wall 25 of the chamber 10 when in inactive position, as shown in Figure 2. Two arms 19 and 20 are pivotably mounted at one end to the supports 17 and 18, respectively, and at their other end to a plunger 24 in the manner shown so that the arms 19 and 20 may pivot freely upon activation of the device until they reach a position which is perpendicular to the shaft 14, whereupon the arms 19 and 20 will rest firmly against the face of recesses provided for them in their respective supports.

The chamber 10 has an opening at its top corresponding to an identical opening in the bottom of pipe 8 of a width sufficient to permit the free entry of plunger 24 and arms 19 and 20 into pipe 8 and of a length corresponding to the inside length of chamber 10.

The operation of my invention will now be described. It is assumed that the plug has come to rest at position 2a at the completion of the calibration run and that all the valves are closed. When it is desired to make a new calibration run, the plug must be moved from position 2a in the loop to a point beyond the inlet, such as at position 2b.

To do this, the valve 3 is opened and the piston 15 is actuated. As the piston 15 drives the shaft 14 forward, the spring 16 holds the support 17 against the stop 22 until guide ring 23 comes into contact with the support 17. By this time, the support 18 is a minimum distance from the support 17, and the arms 19 and 20 have rotated upwardly seating themselves firmly in the recesses provided in their respective supports. The arms 19 and 20 are therefore in the position indicated by the dotted lines in Figure 2 perpendicular to shaft 14 and are raised to their maximum height within pipe 8. In advancing to this position, the arms will have carried the plunger 24 upward into the pipe 8 and into contact with plug 1 as shown in the dotted representation of Figure 2. As the shaft 14 continues to advance, a corresponding advancement of plunger 24 moves the plug 1. In this manner, the plug 1 is impelled forward through the open valve 3 so that by the time the piston 15 moves to the end of the cylinder 11, the shaft 14 will have forced the support 17 to the end of chamber 10 and the plunger 24 will have advanced the plug 1 to position 2b slightly beyond the inlet entrance to the loop 8, as illustrated in Figure 3.

On the backstroke of the piston 15 the shaft 14 retracts and the spring 16 forces the support 17 against the stop 22; and as the shaft further retracts, the supports are spread to their maximum distance apart until support 18 again rests against the wall 25 of the chamber 10, whereupon the arms 19 and 20 and the plunger 24 will have withdrawn from the pipe 8 to a position wholly within the housing of chamber 10, where they will not interfere with the movement of plug 1 on the next calibration run. Valve 3 is then closed.

A calibration now can begin in loop 8 by the opening of valves 6 and 7. The liquid entering loop 8 has adequate opportunity to gain momentum as it forces the plug 1 to the position of switch S1 and will be moving the plug at the full rate of flow by the time switch S1 is actuated. The plug 1 will continue its trip around loop 8 in the manner described before, tripping switch S2 and coming to rest at position 2a. After the valves 6 and 7 are closed, the apparatus remains inactive until it is to be used again for a calibration run.

It will be obvious that variations in structure and mode of operation may be made without departing from the inventive concept herein disclosed, and I intend all of the same to be within my invention as are included within the scope of the following claims.

I claim:

1. An apparatus for repositioning a calibration plug from the ending position in a calibration loop to the starting position for said plug in said loop, comprising a straight pipeline section connecting said ending position in said loop with said starting position in said loop forming a closed continuous conduit therewith, a smooth bore valve in said pipeline section between said ending position and said starting position through which said plug is passed when repositioned, an elongated chamber mounted along said pipeline section and communicating therewith, a plunger normally positioned within said chamber so as not to obstruct the flow of liquid in said pipeline section, means for shifting said plunger from said chamber into said pipeline section and advancing said plunger in contact with said plug for moving said plunger and plug within said pipeline section, and means for retracting said plunger from said pipeline section and shifting said plunger into a position entirely within said chamber.

2. A liquid flowmeter calibrating device comprising a closed continuous loop of pipeline, an inlet and an outlet thereto, a plug device disposed within said loop, a smooth bore valve disposed between said inlet and said outlet through which said plug can pass, a chamber mounted on the exterior of and communicating with said loop, a plunger normally positioned within said chamber so as not to obstruct the flow of liquid in said loop, means for introducing said plunger into said loop and in contact with said plug and for moving said plunger and plug within said pipeline section so that said plug is advanced through said valve from a position between said inlet and said outlet into the remaining portion of said loop, and means for retracting said plunger from said loop to a position entirely within said chamber.

3. In a liquid flowmeter calibrating device having a closed continuous loop of pipeline, an inlet and an outlet thereto, a plug device disposed within said loop, a smooth bore valve disposed between said inlet and said outlet through which said plug can pass, and an electrical switch means mounted in longitudinally spaced relationship in said loop which are actuated by said plug as it moves through said pipeline, the improvement comprising a chamber mounted on the exterior of and communicating with said loop, a plunger normally positioned within said chamber so as not to obstruct the flow of liquid in said loop, means for introducing said plunger into said loop and in contact with said plug and for moving said plunger and plug within said pipeline section so that said plug is advanced through said valve from a position between said inlet and said outlet into the remaining portion of said loop, and means for retracting said plunger from said loop to a position entirely within said chamber.

References Cited in the file of this patent

UNITED STATES PATENTS

| | | |
|---|---|---|
| 1,434,198 | Calhoun | Oct. 31, 1922 |
| 2,669,936 | Elkins et al. | Feb. 23, 1954 |
| 2,772,561 | Plank et al. | Dec. 4, 1956 |
| 2,831,399 | Meekins et al. | Apr. 22 1958 |